June 22, 1926.
F. E. MARTIN
1,590,106
MECHANISM FOR OPERATING HOOK DOGS FOR SAWMILL CARRIAGES
Original Filed June 19, 1922
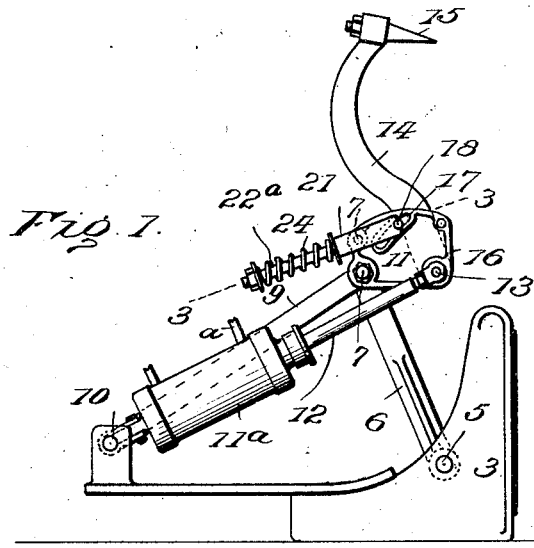
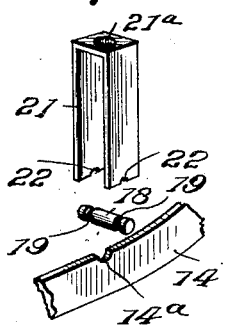
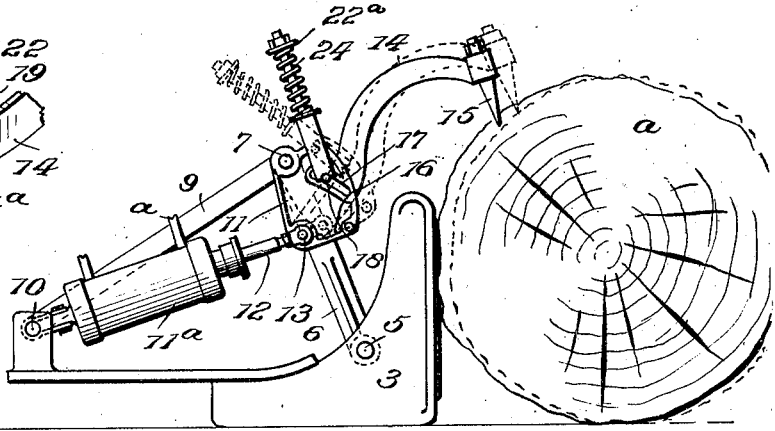
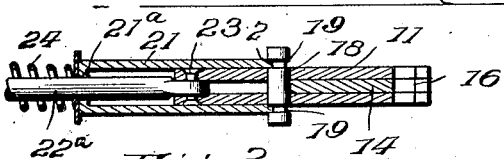
Inventor
F. E. Martin
By
Attorney Patented June 22, 1926.

1,590,106

UNITED STATES PATENT OFFICE.

FREDERICK E. MARTIN, OF WEED, CALIFORNIA, ASSIGNOR TO MARTIN AIR DOG COMPANY, OF SAN FRANCISCO, CALIFORNIA, A CORPORATION OF CALIFORNIA.

MECHANISM FOR OPERATING HOOK DOGS FOR SAWMILL CARRIAGES.

Application filed June 19, 1922, Serial No. 569,498. Renewed May 4, 1926.

This invention relates particularly to improvements in mechanism for operating hook dogs, in connection with saw mill carriages, and by and with means such as disclosed in my application for patent, filed November 25, 1921, Serial No. 517,647.

The hook dogs shown in my co-pending application are operated by means designed to impart to the spike of the dog a movement in a curved path, the center of which is constantly shifting in one direction, to first engage a log, and subsequently pull the log up to the face of the knees on the carriage and hold it in position to be "dogged". In the structure there shown, the floating fulcrum for the dog is located in advance of the fulcrum on which the parts are stayed, while the first or arcuate movement is imparted, and the stay is so arranged that it too becomes a floating fulcrum, with the result that the spike of the dog swings outwardly in a comparatively long stroke and then sharply inwardly toward the knees to first engage the log and then pull it back in position to be cut. By this arrangement, a wider range of log dimensions can be handled with the dogs without liability of their projecting in the path of movement of the saw.

I have however discovered that on small "rigs" designed for holding and positioning small logs within certain limits, a substantially true arcuate movement and subsequent and substantially radial pull on the dog will be effected by rocking the dog on a fixed center and employing spring mechanism to permit of compensating between the dog and its operating means after the dog has engaged the log, so that a continued movement of the operating means will exert a substantially radial pull on the dog, to draw the dog and therefore the log into engagement with the knee.

The improvement therefor differs from that shown in the co-pending application in that in lieu of a floating fulcrum for permitting of the pull on the log, a fixed fulcrum is used and the location of the two fulcrums for supporting the hook are reversed and therefore the path of movement of the spike is in a fixed arc.

My present invention therefore is directed particularly to these features, and its object is to materially simplify the arrangement and make it possible to adapt the mechanism for small rigs to effectively first engage a log in one movement and subsequently pull the log up to the face of the knees, and positively hold it in position to be further gripped and dogged.

In the drawings:

Fig. 1 is a view in elevation showing the improved hook-dog operating means mounted on a knee, with the parts in inoperative positions.

Fig. 2 is a similar view, with the parts in operative positions, the dotted and full line positions indicating the relative arrangement of the parts when the dog engages the log and when it has drawn the log into contact with the knee.

Fig. 3 is an enlarged section on line 3—3 of Fig. 1.

Fig. 4 is a broken perspective, showing in separated relation the pin and engaging yoke, the dog shank being shown as formed with a recess to receive the pin.

The numeral 3 indicates conventionally the knee of a saw mill carriage. 5 indicates a pin on the forward part of the knee, and on this pin is supported an inclined brace 6, to the upper end of which is secured by a pin 7, the upper end of a stay rod 9 secured at its lower end to a pin 10 on the knee, the brace 6 and rod 9 forming a fixed support for a pivotally mounted hook dog frame 11.

Pivoted on the pin 10 is the lower end of a cylinder 11ª, having a piston, the rod 12 of which piston extends through the forward head of the cylinder and is pivotally mounted on a pin 13, arranged in the forward lower end of the hook dog frame 11.

The frame 11 preferably comprises a pair of spaced plates, between which extends the shank 14 of the hook dog. The inner end of the shank is pivoted on the pin 13, while its outer end carries a spike 15. The forward end of the hook dog frame is closed by a junction piece between the plates, thus forming a limit 16 for the shank 14. The upper portions of the plates are formed with transversely aligned arcuate slots 17, the center of the arcuate formation of which is the pin 13. Extending through the arcuate slots is a pin 18, formed with two annular channels 19, each beyond the outer surface of one of the plates, the pin at about its central portion being arranged to cooperate with a semi-circular recess 14ª, in the rear edge of the shank 14.

Near the rear upper end of the hook dog frame 11 is a yoke 21, which yoke embraces the rear of the frame. The free edges of the yoke are recessed at 22 to cooperate with the annular channels 19 in the pin 18, to thereby prevent the pin from lateral displacement. The cross piece of the yoke is formed with an opening 21ª through which a stem 22ª extends, the stem passing between the plates of the frame 11 and pivotally mounted on a pin 23 arranged in the frame plates. The end of the stem beyond the frame 11 is provided with a nut and washer, between which and the yoke is confined a spring 24. The tension of the spring acts to hold the yoke against the pin 18, and the latter in turn against the shank 14 of the dog, and consequently the forward edge of the shank 14 is held against the abutment 16 on the frame.

In operation, a log is rolled on the carriage in the usual manner and pressure is admitted through pipe a, under control of mechanism, such as disclosed in the before mentioned application (but not shown herein) which causes the piston rod to move rearwardly toward the lower or rearmost head of the cylinder. This motion imparts a swinging movement to the hook dog frame 11, the center of movement being the pin 7. The hook dog is thus made to rotate in a circular path from a fixed center toward the log a'. When the spike 15 engages and is driven into the log, and pressure continues in cylinder 11ª, if the log is not up against the knee, the hook dog frame continues to swing on its axis, but as the dog cannot continue its normal circular movement, the spring 24 is brought into play. The movement of the hook dog having been arrested and the hook dog frame continuing to move in the arc of a circle, it follows that the spring 24, through the pin 18 and the yoke 21, will be compressed, compensating for the frame movement and causing the hook dog to follow a substantially direct line, which draws the log up to the knee. The movement of the hook dog frame 11 will continue until the log is brought up into contact with the face of the knee. Of course, the extent of movement between the hook dog and hook dog frame will vary according to the size of the log and its position with reference to the face of the knee. But in any event, the mechanism described will first rock the hook dog to engage a log, and will, after such engagement, cause a separation of the relationship between the dog and its frame and directly pull the log up to the face of the knee and hold it as long as pressure continues in the cylinder. The tension of the spring 24 serves additionally to hold the spike of the dog in engagement with the log and prevent it rising from the log under the pulling strain.

To restore the hook dog to normal position, the controlling valves shown in my pending application are operated, and pressure is introduced to the opposite end of the cylinder and the piston rod is forced out, which in turn reverses the movement of the frame and disengages the spike from the log, and through the action of the spring, the dog and its frame move together.

What I claim is:

1. A hook dog, a frame in which the dog is pivotally mounted, a fixed fulcrum for the frame about which the frame is movable in a non-changing arcuate path, and a spring carried by the frame to normally hold the dog in more or less fixed relation to the frame during the initial arcuate movement of the frame, said spring permitting a movement of the dog independently of the frame in the final arcuate movement of the frame, whereby in the initial arcuate movement of the frame the dog is swung in the arc of a circle and caused to engage a log and in the final arcuate movement of the frame the dog is caused to move in a substantially linear direction.

2. The combination with a saw mill carriage knee of a hook dog, a frame in which the dog is pivotally mounted, a frame fulcrum carried by and at all times fixed with relation to the knee, means for operating the frame about said fulcrum, and a spring carried by the frame to hold the dog in more or less fixed relation with the frame in the absence of resistance to the movement of the dog, said spring permitting an independent movement of the dog and frame following such resistance.

3. A hook dog, a frame in which the dog is pivotally mounted, said frame being formed with a slot, a fixed fulcrum for the frame, and a spring pressed pin slidable in said slot and bearing on the edge of the dog, said pin serving to maintain a more or less fixed relation between the dog and frame during movement of the frame and in the absence of resistance to the movement of the dog.

4. A hook dog, a frame having a fixed fulcrum, a power connection with such frame, said dog being mounted on said power connection and yielding means carried by the frame and bearing on the dog to cause the dog and frame to move together in said simultaneous operation, by said power connection, to permit a yielding of the dog relative to the frame following the engagement of the dog and log, whereby to permit a continued power movement of the frame about the fixed fulcrum with a substantially longitudinal movement of the dog.

5. The combination with the knee of a saw mill carriage, a frame pivotally supported by the knee, a hook dog having a pivotal connection with the frame, and a spring movable with the hook dog and serving to hold said dog and frame in a predetermined relation to cause the spike of the dog to move in a true circular path beyond the face of the knee until resisted, such spring then permitting a relative movement of the dog and frame to cause the succeeding movement of the parts to exert a pull on the dog toward the face of the knee.

6. The combination with the knee of a saw mill carriage, a dog carrying member movable with relation to the knee to operate the dog, a dog pivotally supported by said member, means for operating the member, and a spring movable with the member and dog and arranged to maintain a predetermined relation between the dog and member to thereby cause the spike of the dog to move in a true circular path beyond the face of the knee until resisted, said spring then permitting a relative movement of the dog and member to cause the suceeding movement of the member to exert a pull on the dog toward the face of the knee.

In testimony whereof I affix my signature.

FREDERICK E. MARTIN.